(12) United States Patent
Drescher et al.

(10) Patent No.: US 7,647,445 B2
(45) Date of Patent: Jan. 12, 2010

(54) PROCESSOR BUS ARRANGEMENT

(75) Inventors: Wolfram Drescher, Dresden (DE);
Gerhard Fettweis, Dresden (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/381,216

(22) PCT Filed: Sep. 21, 2001

(86) PCT No.: PCT/DE01/03651

§ 371 (c)(1),
(2), (4) Date: Sep. 2, 2003

(87) PCT Pub. No.: WO02/25455

PCT Pub. Date: Mar. 28, 2002

(65) Prior Publication Data

US 2005/0216640 A1 Sep. 29, 2005

(30) Foreign Application Priority Data

Sep. 22, 2000 (DE) ................................. 100 47 574

(51) Int. Cl.
*G06F 13/36* (2006.01)
(52) U.S. Cl. ....................... 710/306; 710/317; 370/226; 370/403; 370/412; 370/419
(58) Field of Classification Search ................ 710/305, 710/317, 51, 306, 27, 58, 110, 300; 370/402, 370/419, 426, 438, 439, 455, 226, 403; 709/215
See application file for complete search history.

(56) References Cited

U.S. PATENT DOCUMENTS

| | | | | |
|---|---|---|---|---|
| 3,905,025 A | * | 9/1975 | Davis et al. ................. | 710/244 |
| 4,719,562 A | * | 1/1988 | Bailly et al. ................. | 709/215 |
| 4,722,084 A | * | 1/1988 | Morton ........................... | 714/3 |
| 4,811,266 A | * | 3/1989 | Woods et al. ................ | 708/525 |
| 4,991,170 A | * | 2/1991 | Kem ............................ | 710/58 |

(Continued)

FOREIGN PATENT DOCUMENTS

DE           4000673           7/1991

(Continued)

OTHER PUBLICATIONS

Loucks et al. A Vector Processor Based on One-Bit Microprocessors. University of Toronto. IEEE. Feb. 1982.*

(Continued)

*Primary Examiner*—Mark Rinehart
*Assistant Examiner*—Matthew D Spittle

(57) ABSTRACT

A processor bus has several data processing units, each connected to a line system which acts as a bus having bus segments connected in a separable manner through connection units. Functional units arranged on the bus carry out the information thereof. The functional units may carry out exchanges independently of each other. Conversely, functional units in different groups may carry out information exchanges simultaneously. The connection units define combinatory connections of the signal lines, with physical connections between the connection units provided by the bus segments. The connection units can carry out information exchanges with as many connected functional units as desired. The information path from a functional unit to selected functional units can be multiplexed or switched by toggling simultaneous connections to several functional units or by bridging non-participating functional units.

8 Claims, 4 Drawing Sheets

U.S. PATENT DOCUMENTS

| | | | | |
|---|---|---|---|---|
| 5,051,986 A | * | 9/1991 | Grow et al. | 370/455 |
| 5,198,758 A | * | 3/1993 | Iknaian et al. | 714/724 |
| 5,305,443 A | * | 4/1994 | Franzo | 710/110 |
| 5,313,595 A | * | 5/1994 | Lewis et al. | 710/305 |
| 5,502,817 A | | 3/1996 | Krone et al. | 395/200.16 |
| 5,561,819 A | * | 10/1996 | Gephardt et al. | 710/27 |
| 5,671,386 A | | 9/1997 | Blair et al. | 395/402 |
| 5,761,516 A | * | 6/1998 | Rostoker et al. | 710/260 |
| 5,838,603 A | * | 11/1998 | Mori et al. | 365/63 |
| 5,841,997 A | * | 11/1998 | Bleiweiss et al. | 710/317 |
| 6,009,491 A | | 12/1999 | Roppel et al. | 710/305 |
| 6,038,381 A | * | 3/2000 | Munch et al. | 716/1 |
| 6,081,863 A | | 6/2000 | Kelley et al. | 710/129 |
| 6,772,269 B1 | * | 8/2004 | Kaganoi | 710/310 |

FOREIGN PATENT DOCUMENTS

DE    19619886 A1    11/1997

OTHER PUBLICATIONS

Matsumae, Susumu. Simulation of Meshes with Separable Buses by Meshes with Multiple Partitioned Buses. IEEE Computer Society. 2003.*

Cheung et al. Routing with Locality on Meshes with Buses. Journal of Parallel and Distributed Computing. Academic Press, Inc. Article No. 0027. 1996.*

Carlo Kopp, Vector Processing Futures, 2000, http://www.ausairpower.net/OSR-0600.html.

Gurindar Singh Sohi, High-Bandwidth Interleaved Memories for Vector Processors—A Simulation Study, IEEE Transaction on Computers, vol. 42, No. 1, Jan. 1993, pp. 34-44.

Christine Fricker, On Memory Contention Problems in Vector Multiprocessors, IEEE Transaction on Computers, vol. 44, No. 1, Jan. 1995, pp. 92-105.

Kain, "Advanced Computer Architecture", title pg., copyright pg., pp. 376-85.

Flynn, Michael J., "Computer Architecture", title pg., copyright pg., pp. 433-38.

* cited by examiner

PROCESSOR BUS ARRANGEMENT

CROSS-REFERENCE TO RELATED APPLICATION

This application is a National Phase of International Application PCT/DE01/03651, filed Sep. 21, 2001.

FIELD OF THE INVENTION

The present invention relates to a processor bus arrangement having a first and a second data processing unit, each of which is connected to a system of lines combined as a bus.

BACKGROUND OF THE INVENTION

The most common connecting structures between the functional units of circuits, in particular computers, are buses. Such a bus can be implemented either internal to a chip or between chips, for example as the system bus of a computer that exchanges data between the individual functional units. In the simplest case, the bus forms a node between line segments that realize the connections to the functional units with taps arranged in a star configuration. However, the bus arrangements of functional units described in summary by Kain in "Advanced Computer Architecture" (ISBN 0-13-007741-0), pp. 376-385 with the following topologies are also common: 1. individual point-to-point connection, 2. bus with bus controller, 3. multiple buses, 4. crosspoint switching system, 5. n-dimensional assigned functional units, 6. tree structures, 7. ring structures, 8. multilayer network with intermediate connections, 9. hierarchical structures.

To prevent information collisions from occurring on the bus, only one functional unit at a time may transmit its information onto the bus. To control such information exchange, the functional units are provided with interfaces which for the most part are mechanically and electrically specified, and are standardized, and thus ensure the time sequencing of allowed bus signals for the individual components.

The greatest disadvantage of prior art bus systems can be seen here in that only a single data transport can take place at any point in time. This leads to bottlenecks in data transmission on the bus, while the processing speed of the individual functional units is not fully utilized. Moreover, there are clear physical limits on improving utilization of the processing speed of the system by increasing the data transmission rate on the bus through increases in the computer clock speed.

Even the known prior art method of prefetching is only effective to a limited extent in achieving the desired utilization of the processing speed of the CPU, since the commands that are loaded in advance in this method must of necessity be discarded if the program conditions require it in the course of executing the program. As a result, the speed increase achieved is in part rendered ineffective in the processing of commands by the CPU.

Yet another method known from prior art, that of temporarily storing frequently needed recent commands, and also data, in a cache memory and thus avoiding additional data transmission across the bus, brings only a limited gain in increasing the processing speed of the CPU.

It is also necessary to mention a vector processor solution described in "Computer Architecture" by Michael J. Flynn (ISBN 0-86720-204-39), pp. 434-438. Here, data sets to be processed with the same operation, but which are prepared by different functional units, are combined in so-called vector registers. Within such a vector structure of specific length, these data sets are supplied as indexed blocks for processing with the required operation, e.g. ADD, MULTIPLY.

Thus, the greatest disadvantage in increasing the data transmission rate on a bus in prior art clearly consists in that it is not possible for functional units acting independently of one another to use the bus in parallel.

The object of the present invention is making it possible for functional units connected to a bus to communicate simultaneously and independently of one another.

SUMMARY OF THE INVENTION

The solution in accordance with the present invention includes a bus that has a connection unit and bus segments, wherein the bus segments are connected to the bus in a separable manner by means of the connection unit.

The present invention ensures that the functional units that are arranged on the bus and exchange their information through the bus can perform this exchange independently of other functional units. Moreover, other functional units in additional groups can also carry out a separate information exchange through this bus at the same time. While the connection units perform the function of defined combinatorial connection of the signal lines, the bus segments provide line connections between the connection units.

An advantageous embodiment of the solution in accordance with the invention consists in that multiple paths, which unidirectionally or bidirectionally perform data transmission in the connection unit, are arranged in the connection unit.

This method ensures that the connection unit carries out information exchange with any desired number of functional units arranged thereon. The information paths from a functional unit can be assigned to selected functional units by switchover or to multiple functional units at the same time by add-on switching. Depending on equipment, the multiple paths can be unidirectional or bidirectional. In the unidirectional implementation of the connection unit, care is taken that in the choice of communicating functional units, only one functional unit can transmit at a time, while all other functional units participating in the communication can only receive information.

In the bidirectional implementation of the connection unit, the connected functional units can send and receive. The connection unit uses an additional directional channel (right, left) to ensure the associated directional dependence of the information exchange.

Another advantageous embodiment of the solution in accordance with the invention consists in that a second and a third connection unit are arranged in a chain with the first connection unit as a repeater structure.

This implementation makes special provision that an information exchange on the bus takes place not only with functional units that are immediately adjacent to the connection unit, but also that, in such an advantageous arrangement of the connection units, their implementation as a repeater structure can be optimized in technical and economic terms. It also simplifies the bus structure as a whole when the connection unit is designed to be chainable as a repeater structure. To this extent, the connection units can be conceptualized as components of a matrix with favorably arranged interfaces, and it also simplifies the design of the bus segments to likewise be a number of repeatably arranged basic forms.

A special advantageous embodiment of the solution in accordance with the invention provides that the connection units of the repeater structure are arranged chained together in a star and/or ring shape. Particular attention is paid here in the design of the processor arrangement in accordance with the invention to achievable signal propagation times in the exchange of information between functional units that are favorably arranged relative to one another and which frequently communicate with one another. Optimal adaptation in this regard can be obtained by the choice of the processor bus arrangement, whether as a ring, a chain or mixed forms.

Another particular advantageous embodiment of the invention provides that the connection units are wired to bridge across adjacent connection units. In order to keep signal propagation times low, when connection units are traversed for which the connected functional units are not participating in the information exchange, they are bridged, i.e. the number of gates traversed and the signal path lengths per connection unit are minimized here.

Another particular advantageous embodiment of the invention provides that termination units are arranged at each end of the chained repeater structure of connection units.

In this context, connection units equipped as termination units are used that can be connected at their connection sides only to the single directly adjacent connection unit. No additional connections for connecting to other connection units are provided. The termination unit provides a default state for the control of the connection units of the bus, which is assumed when no signals from the controlling processing unit are present.

An advantageous embodiment of the solution in accordance with the invention provides that the termination unit is switched onto the repeater structure as a terminator without additional connection, or that it is also directly connected to connection units by a tap, shortening signal propagation times. A special form of a termination unit is implemented in this context, wherein an additional connection to a desired connection unit is made through the necessary bus segments on the connection side, in addition to the directly adjacent connection unit. This connection option is used to reduce signal propagation times for functional units that communicate under conditions where signal propagation time is critical.

An important advantageous implementation of the solution in accordance with the invention provides that the connection unit is constructed of multiplexers. Implementation of the connection unit with multiplexer components is used by preference. In this way, the switching functions can be realized with minimum component count.

Another important advantageous implementation of the solution in accordance with the invention provides that the multiplexer gate function is expanded so as to be switchable to the logical operations OR and XOR. For additional tasks on the bus, a functional switchover is provided that performs signal combinations with other logical operations such as OR or XOR.

BRIEF DESCRIPTION OF THE DRAWINGS

The present invention may be better understood with reference to the attached drawings described below.

DETAILED DESCRIPTION

Figure 1:
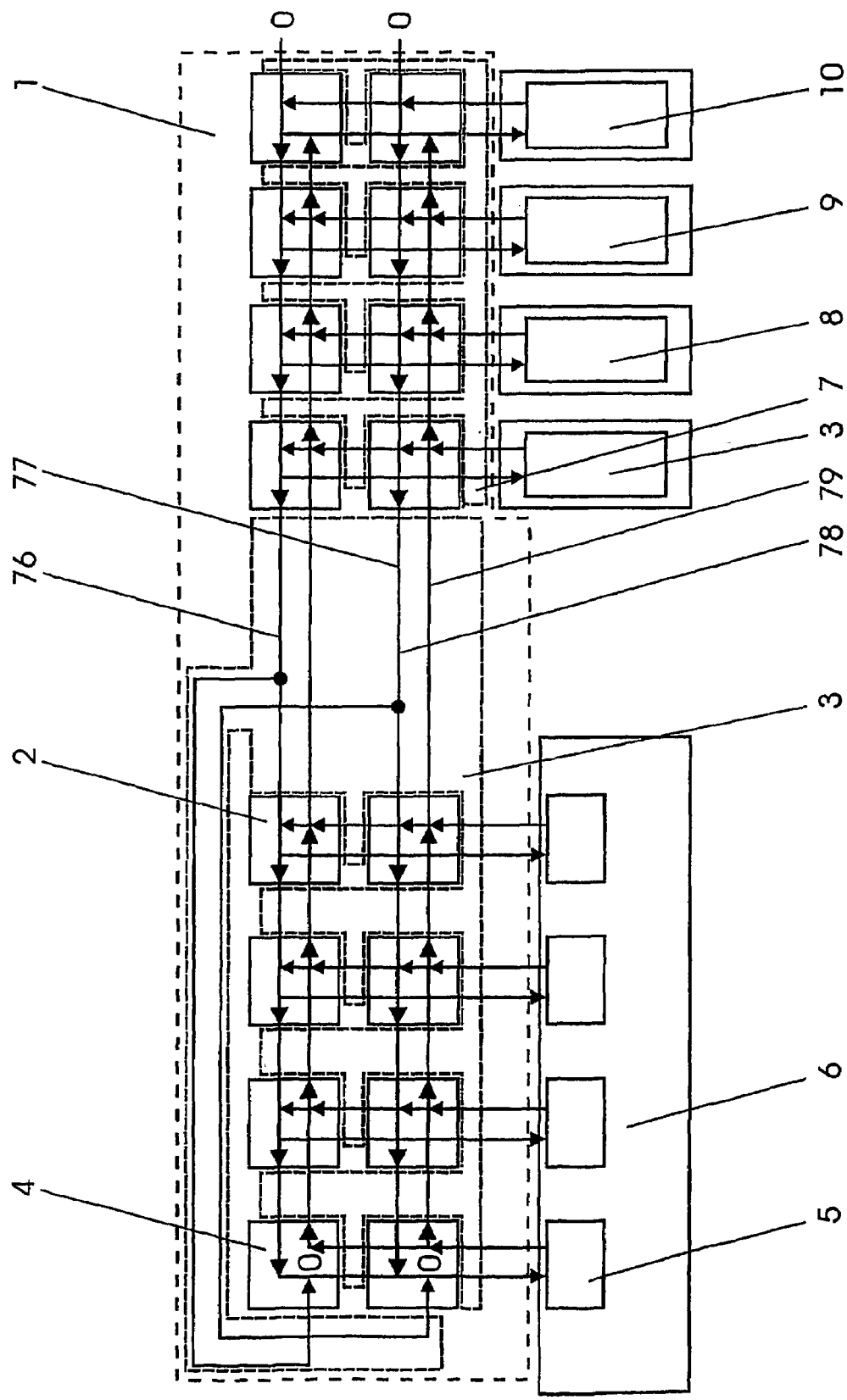
FIG. 1 shows a block diagram of the processor bus arrangement with the assignment of the functional units to the connection units and bus segments.

As can be seen in FIG. 1, the bus 1 consists of bidirectional connection units 2 and bus segments 3. The connection units are of a two-track design and carry the data paths ICUBUS0R 79 and ICUBUS0L 78 in the first track, and the data paths ICUBUS1R 77 and ICUBUS1L 76 in the second track. Arranged on this bus 1 are the IOU functional unit 10, AGU functional unit 9, PCU functional unit 8, GPU functional unit 7, RFU functional unit 6, which in turn consists of multiple DPU functional units 5.

The ends of the bus are equipped with termination units 4, which upon loss of external bus control signals internally implement the bus with a default state labeled "0". The data paths ICUBUS1L 76 and ICUBUS0L 78 are branched off via bus segments 3 and fed by means of the termination units 4 to the connection units 2 arranged at the end of bus 1, reducing propagation time.

Figure 2:
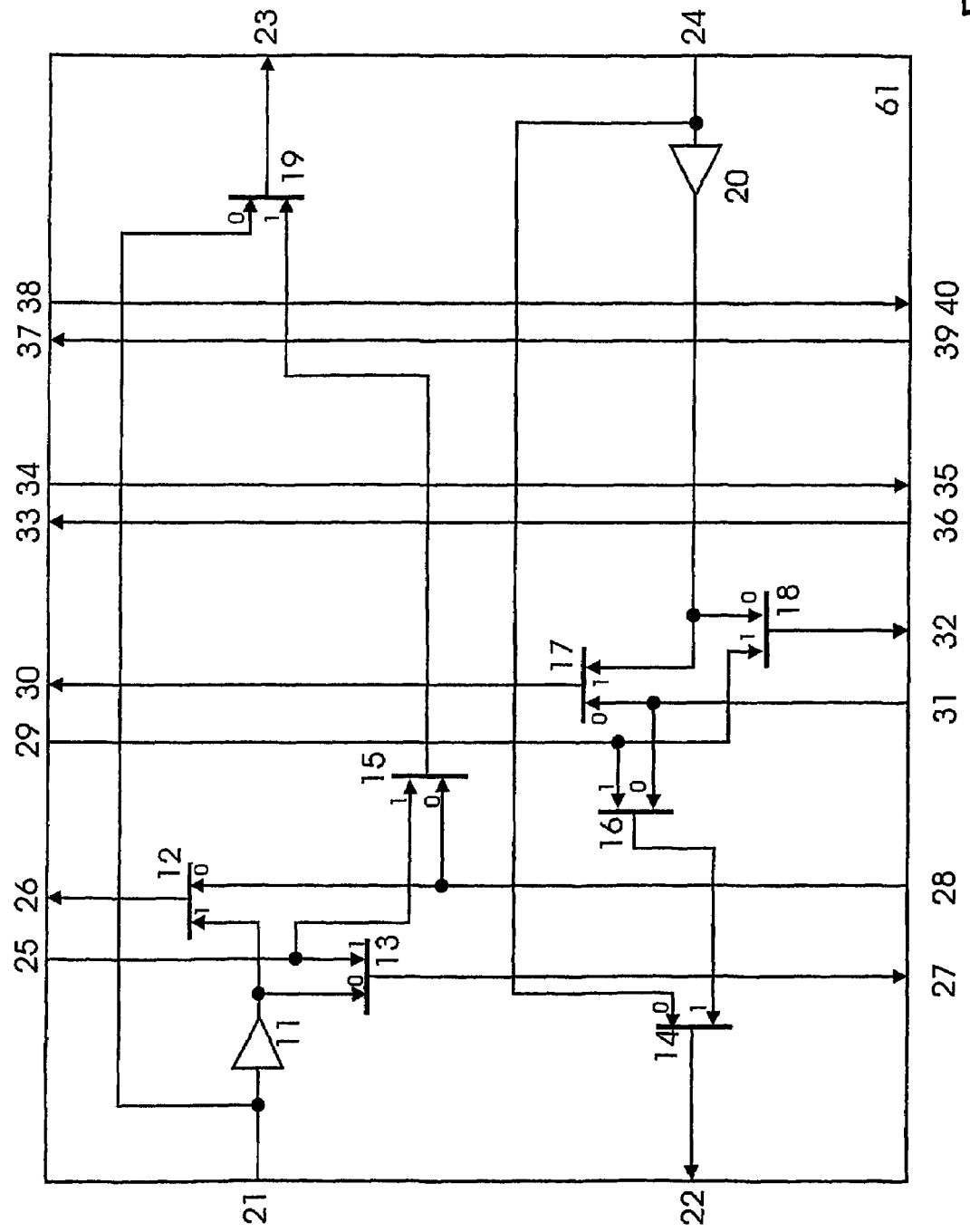
FIG. 2 shows a functional diagram of the multiplexer embodiment of a connection unit which implements combination of the bidirectional ICU right/left data path with a crossing track of a likewise bidirectional data path to connect two functional units.

FIG. 2 shows how the multiplexer implementation of the illustrated connection unit combines the bidirectional ICU right/left data path with a crossing track of a likewise bidirectional data path to connect two functional units, here by way of example the RFU functional unit 6 and a MEM functional unit not shown in FIG. 1. Here, the ICU right data path is routed through the ICU_In_Right signal line 21, and with appropriate "pass-through" control is routed directly through the first output gate 19 to the ICU_Out_Right signal line 23. The ICU left data path leads through the ICU_In_Left signal line 24, and with appropriate "pass-through" control is routed directly through the fourth output gate 14 to the ICU_Out_Left signal line 22.

Moreover, the ICU right data path is routed through the input signal amplifier 11, and with appropriate control in "switchover" is routed either through the second output gate 12 to the MEM_Out_Slc1_Right signal line 26 or through the third output gate 13 to the RFU_Out_Slc1_Right signal line 27. In contrast, the ICU left data path is routed through the input signal amplifier 20, and with appropriate control in "switchover" is routed either through the fifth output gate 17 to the MEM_Out_Slc1_Left signal line 30 or through the sixth output gate 18 to the RFU_Out_Slc1_Right signal line 32.

The MEM right data path passes through the MEM_In_Slc1_Right signal line 25, either directly through the third output gate 13 to the RFU_Out_Slc1_Right signal line 27 with appropriate "pass-through" control, or through the first logic gate 15 and the first output gate 19 to the ICU_Out_Right signal line 23 with appropriate "switchover" control.

In addition, it is important to note that the MEM right data path in Slice0 passes through the MEM_In_Slc0_Right signal line 34 directly to the RFU_Out_Slc0_Right signal line 35.

The MEM left data path passes through the MEM_In_Slc1_Left signal line 29, either directly through the sixth output gate 18 to the RFU_Out_Slc1_Left signal line 32 with appropriate "pass-through" control, or through the second logic gate 16 and the second output gate 14 to the ICU_Out_Left signal line 22 with appropriate "switchover" control.

In addition, it is important to note that the MEM left data path in Slice0 passes through the MEM_In_Slc0_Left signal line 38 directly to the RFU_Out_Slc0_Left signal line 40. The RFU right data path in Slice1 passes through the RFU_In_Slc1_Right signal line 28, either directly through the second output gate 12 to the MEM_Out_Slc1_Right signal line 26 with appropriate "pass-through" control, or through the first logic gate 15 and the first output gate 19 to the ICU_Out_Right signal line 23 with appropriate "switchover" control. In addition, it is important to note that the RFU right data path in Slice0 passes through the RFU_In_Slc0_Right signal line 36 directly to the MEM_Out_Slc0_Right signal line 33.

The RFU left data path in Slice1 passes through the RFU_In_Slc1_Left signal line 31, either directly through the fifth output gate 17 to the MEM_Out_Slc1_Left signal line 30 with appropriate "pass-through" control, or through the second logic gate 16 and the second output gate 14 to the ICU_Out_Left signal line 22 with appropriate "switchover" control.

In addition, it is important to note that the RFU left data path in Slice0 passes through the RFU_In_Slc0_Left signal line 39 directly to the MEM_Out_Slc0_Left signal line 37.

Figure 3:
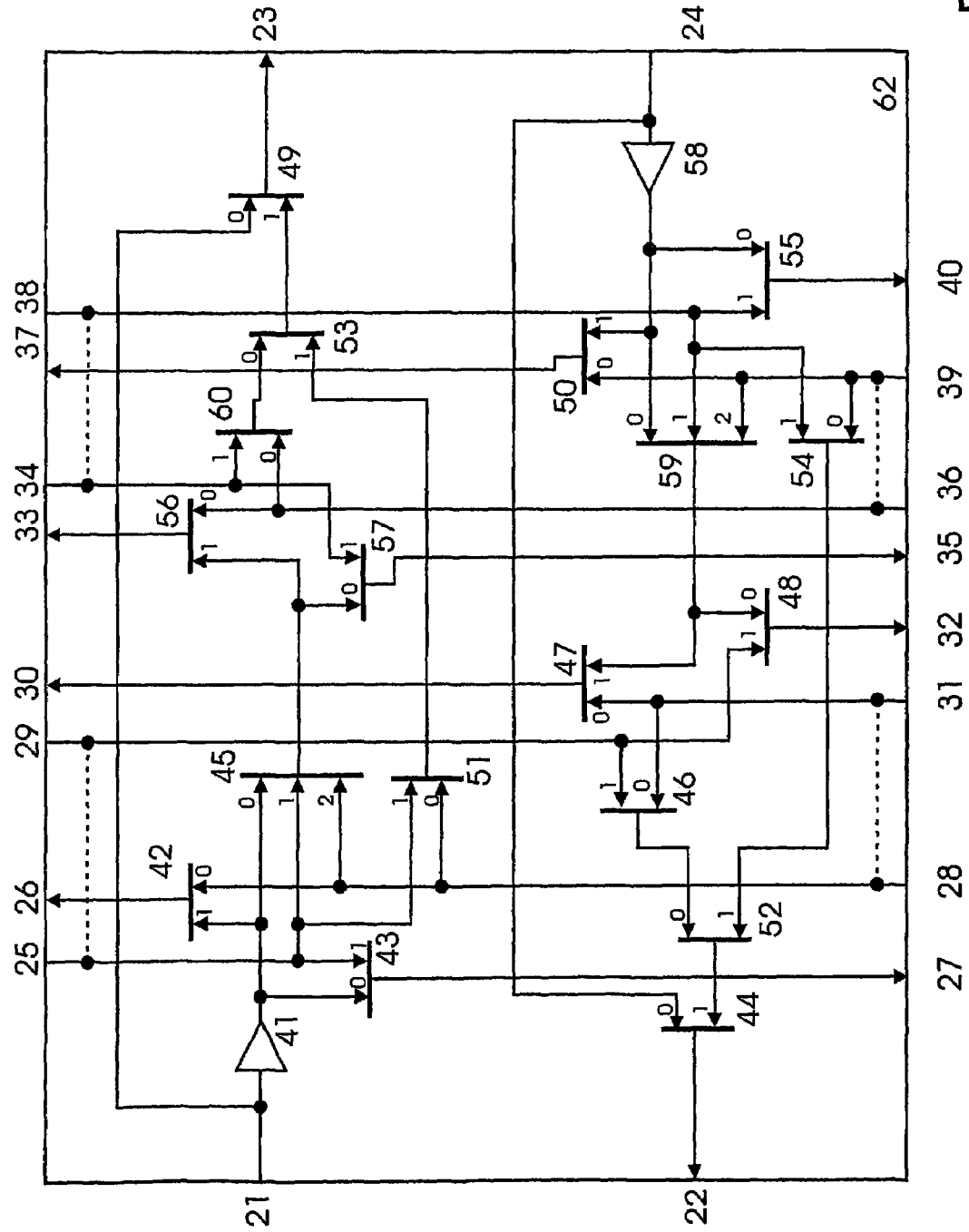
FIG. 3 shows a functional diagram of the multiplexer embodiment of a connection unit which implements combination of the bidirectional ICU right/left data path with two crossing tracks of likewise bidirectional data paths to connect two functional units.

FIG. 3 shows how the multiplexer implementation of the illustrated connection unit combines the bidirectional ICU right/left data path with two crossing tracks of likewise bidirectional data paths to connect two functional units, here by way of example the RFU functional unit 6 and a MEM functional unit not shown in FIG. 1. Here, the ICU right data path is routed through the ICU_In_Right signal line 21, and with appropriate "pass-through" control is routed directly through the seventh output gate 49 to the ICU_Out_Right signal line 23. The ICU left data path leads through the ICU_In_Left signal line 24, and with appropriate "pass-through" control is routed directly through the tenth output gate 44 to the ICU_Out_Left signal line 22.

Moreover, the ICU right data path for Slice1 is amplified by the third input signal amplifier 41, and with appropriate control in "switchover" is routed either through the eighth output gate 42 to the MEM_Out_Slc1_Right signal line 26 or through the ninth output gate 43 to the RFU_Out_Slc1_Right signal line 27. Similarly, the ICU right data path for Slice0 is amplified by the third input signal amplifier 41, and with appropriate control in "switchover" is routed through the third logic gate 45 and either through the fifteenth output gate 56 to the MEM_Out_Slc0_Right signal line 33 or through the sixteenth output gate 57 to the RFU_Out_Slc0_Right signal line 35.

In contrast, the ICU left data path for Slice1 is amplified by the fourth input signal amplifier 58, and with appropriate control in "switchover" is routed either through the ninth logic gate 59 and the eleventh output gate 47 to the MEM_Out_Slc1_Left signal line 30 or through the ninth logic gate 59 and the twelfth output gate 48 to the RFU_Out_Slc1_Right signal line 32.

The ICU left data path for Slice0 is likewise amplified by the fourth input signal amplifier 58, but with appropriate control in "switchover" is routed either through the fourteenth output gate 50 to the MEM_Out_Slc0_Left signal line 37 or through the thirteenth output gate 55 to the RFU_Out_Slc0_Left signal line 40.

The MEM right data path for Slice1 passes through the MEM_In_Slc1_Right signal line 25, either directly through the ninth output gate 43 to the RFU_Out_Slc1_Right signal line 27 with appropriate "pass-through" control, or through the fourth logic gate 51 and the fifth logic gate 53 and the seventh output gate 49 to the ICU_Out_Right signal line 23 with appropriate "switchover" control.

Likewise, the MEM right data path for Slice1 passes through the MEM_In_Slc1_Right signal line 25, but then through the third logic gate 45, either through the fifteenth output gate 56 to the MEM_Out_Slc0_Right signal line 33, or through the sixteenth output gate 57 to the RFU_Out_Slc0_Right signal line 35, in accordance with the "switchover" control.

The MEM right data path for Slice0 passes through the MEM_In_Slc0_Right signal line 34, either directly through the sixteenth output gate 57 to the RFU_Out_Slc0_Right signal line 35 with appropriate "pass-through" control, or through the tenth logic gate 60, the fifth logic gate 53 and the seventh output gate 49 to the ICU_Out_Right signal line 23 with appropriate "switchover" control.

The MEM left data path for Slice1 passes through the MEM_In_Slc1_Left signal line 29, then either directly through the twelfth output gate 48 to the RFU_Out_Slc0_Left signal line 32 with appropriate "pass-through" control, or through the sixth logic gate 46 and the seventh logic gate 52 as well as the tenth output gate 44 to the ICU_Out_Left signal line 22 with appropriate "switchover" control.

In addition, the MEM left data path in Slice0 passes through the MEM_In_Slc0_Left signal line 38, either directly through the thirteenth output gate 55 to the RFU_Out_Slc0_Left signal line 40 with appropriate "pass-through" control, or through the eighth logic gate 54 and the seventh logic gate 52 as well as the tenth output gate 44 to the ICU_Out_Left signal line with appropriate "switchover" control. Moreover, the MEM left data path in Slice0 passes through the MEM_In_Slc0_Left signal line 38 through the ninth logic gate 59 with appropriate "switchover" control, and either through the eleventh output gate 47 to the MEM_Out_Slc1_Left signal line 30 or through the twelfth output gate 48 to the RFU_Out_Slc1_Left signal line 32.

The RFU right data path in Slice1 passes through the RFU_In_Slc1_Right signal line 28, either directly through the eighth output gate 12 to the MEM_Out_Slc1_Right signal line 26 with appropriate "pass-through" control, or through the fourth logic gate 51 and the fifth logic gate 53 and the seventh output gate 49 to the ICU_Out_Right signal line 23 with appropriate "switchover" control.

The RFU right data path in Slice1 also passes from the RFU_In_Slc1_Right signal line 28 through the third logic gate and either through the fifteenth output gate 56 to the MEM_Out_Slc0_Right signal line 33 or through the sixteenth output gate 57 to the RFU_Out_Slc0_Right signal line 35 with appropriate "switchover" control.

Moreover, the RFU right data path in Slice0 passes from the RFU_In_Slc0_Right signal line 36, either directly through the fifteenth output gate 56 to the MEM_Out_Slc0_Right signal line 33 with appropriate "pass-through" control, or through the tenth logic gate 60 and the fifth logic gate 53 and the seventh output gate 49 to the ICU_Out_Right signal line 23 with appropriate "switchover" control.

The RFU left data path in Slice1 passes from the RFU_In_Slc1_Left signal line 31, either directly through the eleventh output gate 47 to the MEM_Out_Slc1_Left signal line 30 with appropriate "pass-through" control, or through the sixth logic gate 46 and the seventh logic gate 52 and the tenth output gate 44 to the ICU_Out_Left signal line 22 with appropriate "switchover" control.

The RFU left data path in Slice0 passes from the RFU_In_Slc0_Left signal line 39, either directly through the fourteenth output gate 50 to the MEM_Out_Slc0_Left signal line 37 with appropriate "pass-through" control, or through the eighth logic gate 54 and the seventh logic gate 52 and the tenth output gate 44 to the ICU_Out_Left signal line 22 with appropriate "switchover" control. Moreover, the RFU left data path in Slice0 passes from the RFU_In_Slc0_Left signal line 39 through the ninth logic gate 59 with appropriate "switchover" control and either through the eleventh output gate 47 to the MEM_Out_Slc1_Left signal line 30 or through the twelfth output gate 48 to the RFU_Out_Slc1_Left signal line 32.

Figure 4:
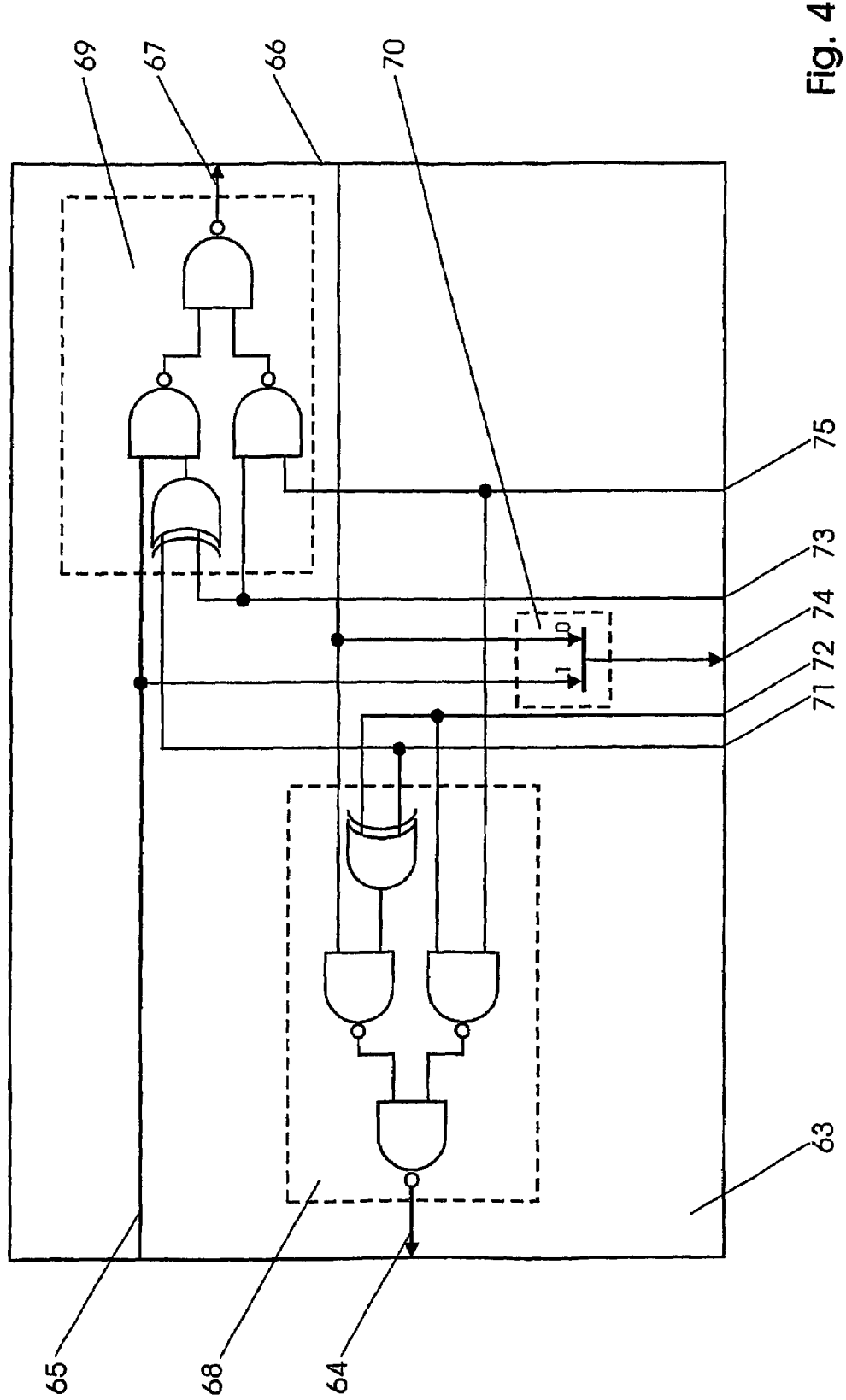
FIG. 4 is a functional diagram of OR function expansion of a multiplexer connection unit.

In the functional diagram of OR function expansion of a multiplexer connection unit shown in FIG. 4, an ICU right data path passes from the ICU_right_in signal line 65 to an icuwmux subunit 70 and to an icurmux or/multiplex subunit 69 whose output is connected to the ICU_right_out signal line 67. An ICU left data path passes from the ICU_left_in signal line 66 to an icuwmux subunit 70 and to an iculmux or/multiplex subunit 68 whose output is connected to the ICU_left_out signal line 64. The RFU_in signal line 75 is connected to the corresponding second inputs of icurmux or/multiplex subunit 69 and iculmux or/multiplex subunit 68 for the required signal processing. In addition, on the curmux or/multiplex subunit 69 and iculmux or/multiplex subunit 68 is an ICUORMUX_ctrl signal line 71 whose logical assignment can be used for functional selection of the multiplex function or OR function expansion for the two subunits. Gate control for the subunits is performed using the ICULMUX_ctrl signal line 72 connected to the iculmux or/multiplex subunit 68 and the ICURMUX_ctrl signal line 73 connected to the icurmux or/multiplex subunit 69.

While there have been described what are believed to be the preferred embodiments of the present invention, those skilled in the art will recognize that other and further changes and modifications may be made thereto without departing from the spirit of the invention, and it is intended to claim all such changes and modifications as all within the true scope of the invention.

The invention claimed is:

1. A processor bus arrangement in a single chip vector processor, comprising:
    at least a first and a second data processing units internal to the single chip vector processor, each of which is connected to a system of lines combined as a bus internal to the vector processor,
    wherein the bus has connection units and bus segments, wherein the bus segments provide line connections to and between the connection units of the vector processor,
    wherein the bus segments are connected to the bus in a separable manner by means of the connection units so that each bus segment operates as a bus between interconnected data processing units of the vector processor even when isolated from the remaining bus and bus segments,
    wherein the bus has multiple paths, which unidirectional or bidirectionally perform data transmission, are arranged in the connection unit,
    wherein a second and a third connection unit are arranged in a chain with a first connection unit as a repeater structure, wherein the connection units of the repeater structure are arranged chained together in one of a star and a ring, and wherein the connection units are arranged to bridge across adjacent connection units.

2. The processor bus arrangement according to claim 1, wherein a termination unit is arranged at each end of the chained repeater structure of said connection units.

3. The processor bus arrangement according to claim 2, wherein a termination unit is switched onto the repeater structure as a terminator without additional connection.

4. The processor bus arrangement according to claim 2, wherein a termination unit is directly connected to connection units.

5. The processor bus arrangement according to claim 1, wherein the connection unit comprises a multiplexer.

6. The processor bus arrangement according to claim 5, wherein the multiplexer gate function is expanded to the logical operations OR and XOR.

7. The processor bus arrangement according to claim 5, wherein the multiplexer is a bidirectional multiplexer wherein;
    an ICU_IN_RIGHT signal line is connected to a first input of a first input signal amplifier and simultaneously to a first input of a first output gate, whose output is connected to the ICU_Out_Right signal line;
    the output of the first input signal amplifier is connected to a first input of a second output gate and simultaneously to a first input of a third output gate,
    a second input is connected to the MEM_In_SLC1_Right signal line and simultaneously to a first input of a first logic gate and wherein the output is connected the second input of the first output gate;
    the output of the second output gate is connected to a signal line MEM_Out_SLC1_Right and the input of the second output gate is connected to a signal line RFU_In_Slc1_Right and simultaneously to the second input of the first logic gate,
    the output of the third output gate is connected to an RFU_Out_Slc1_Right signal line, wherein an ICU_IN_Left signal line is connected to an input of a second input signal amplifier and simultaneously to a first input of a fourth output gate and its output is connected to an ICU_Out_Left signal line;
    the output of the second input signal amplifier is connected to a first input of a fifth output gate and simultaneously to a first input of sixth output gate whose second input is connected to the MEM_In_SL1_Left signal line and simultaneously to a first input of a second logic gate and whose output is connected to the second input of the fourth output gate;
    the output of the fifth output gate is connected to a signal line MEM_Out_SLC1_Left and the second input of a fifth output gate is connected to a signal line RFU_In_Slc1_Left and simultaneously to the second input of the second logic gate;
    the output of the sixth output gate is connected to an RFU_Out_Slc1_Left signal line;
    a signal line RFU_In_Slc0_Right is connected to a signal line MEM_Out_Slc0_Right;
    a signal line RFU_Out_Slc0_Right is connected to a signal line MEM_In_Slc0_Right;
    a signal line RFU_In_Slc0_Left is connected to a signal line MEM_Out_Slc0_Left; and
    a signal line RFU_Out_Slc0_Left is connected to a signal line MEM_Out_Slc0_Left.

8. The processor bus arrangement according to claim 5, wherein the multiplexer is a dual slice bidirectional multiplexer wherein;
    an ICU_IN_RIGHT signal line is connected to a first input of a third input signal amplifier and simultaneously to a first input of a seventh output gate and whose output is connected to the ICU_Out_Right signal line;

the output of the third input signal amplifier is connected to a first input of an eighth output gate and simultaneously to a first input of a ninth output gate as well as to a first input of a third logic gate;

the second input of the ninth output gate is connected to the MEM_In_SL1_Right signal line and simultaneously to the second input of the third logic gate as well as a first input of a fourth logic gate and whose output is connected to a first input of a fifth logic gate;

the output of the eighth output gate is connected to a signal line MEM_Out_SLC1_Right and its second input is connected in turn to a signal line RFU_In_Slc1_Right and simultaneously to the third input of the third logic gate and the second input of the fourth logic gate;

the output of the ninth output gate is connected to an RFU_Out_Slc1_Right signal line;

the output of the third logic gate is connected to a first input of a fifteenth output gate and simultaneously to a first input of a sixteenth output gate whose output is in turn connected to the RFU_Out_Slc0_Right signal line;

the RFU_In_Slc0_Right signal line is connected to the second input of the fifteenth output gate and also to a first input of a tenth logic gate wherein its output is connected to the second input of the fifth logic gate;

the second input of the tenth logic gate is connected to the MEM_In_Slc0_Right signal line and also to the second input of the sixteenth output gate;

the output of the fifteenth output gate is connected to the MEM_Out_Slc0_Right signal line;

the output of the fifth logic gate is connected to the second input of the seventh output gate;

an ICU_IN_Left signal line is connected to a first input of a fourth input signal amplifier and simultaneously to a first input of a tenth output gate and its output is connected to the ICU_Out_Left signal line;

the output of the fourth input signal amplifier is connected to a first input of a thirteenth output gate and simultaneously to a first input of a fourteenth output gate as well as to a first input of a ninth logic gate;

the second input of the fourteenth output gate is connected to the RFU_In_SLc0_Left signal line and simultaneously to the second input of the ninth logic gate as well as to a first input of an eighth logic gate and whose output is connected to a first input of a seventh logic gate;

the output of the thirteenth output gate is connected to a signal line RFU_Out_SLC0_Left and its second input in turn is connected to a signal line MEM_In_Slc0_Left and simultaneously to the third input of the ninth logic gate and also to the second input of the eighth logic gate;

the output of the fourteenth output gate is connected to a MEM_Out_Slc0_Left signal line;

the output of the ninth logic gate is connected to a first input of an eleventh output gate and simultaneously to a first input of a twelfth output gate whose output in turn is connected to the RFU_Out_Slc1_Left signal line;

the MEM_In_Slc1_Left signal line is connected to the second input of the twelfth output gate and also to a first input of a sixth logic gate wherein its output is connected to the second input of the seventh logic gate;

the second input of the sixth logic gate is connected to the RFU_In_Slc1_Left signal line and also to the second input of the eleventh output gate whose output is connected to the MEM_Out_Slc1_Left signal line; and the output of the seventh logic gate is connected to the second input of the seventh output gate.

* * * * *